(12) United States Patent
Hattori et al.

(10) Patent No.: US 11,362,614 B2
(45) Date of Patent: Jun. 14, 2022

(54) POWER CONVERSION APPARATUS, DRIVE CONTROL SYSTEM, MACHINE LEARNING APPARATUS, AND MOTOR MONITORING METHOD

(71) Applicant: Mitsubishi Electric Corporation, Tokyo (JP)

(72) Inventors: Norikazu Hattori, Tokyo (JP); Norihiro Suzuki, Tokyo (JP); Tetsuo Tanaka, Tokyo (JP); Naoto Norina, Tokyo (JP); Takahiro Harada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/429,635

(22) PCT Filed: Nov. 21, 2019

(86) PCT No.: PCT/JP2019/045711
§ 371 (c)(1),
(2) Date: Aug. 10, 2021

(87) PCT Pub. No.: WO2020/188886
PCT Pub. Date: Sep. 24, 2020

(65) Prior Publication Data
US 2022/0045641 A1    Feb. 10, 2022

(30) Foreign Application Priority Data
Mar. 18, 2019  (WO) .................. PCT/JP2019/011139

(51) Int. Cl.
*H02P 27/08*     (2006.01)
*H02M 1/00*     (2006.01)
(Continued)

(52) U.S. Cl.
CPC .......... *H02P 27/08* (2013.01); *H02M 1/0009* (2021.05); *H02P 29/024* (2013.01); *H02M 1/083* (2013.01)

(58) Field of Classification Search
CPC ...... H02P 1/00; H02P 1/04; H02P 1/16; H02P 1/163; H02P 1/18; H02P 1/24; H02P 1/26;
(Continued)

(56) References Cited

U.S. PATENT DOCUMENTS 5,663,627 A    9/1997 Ogawa
8,558,415 B2   10/2013 Fujita et al.
(Continued)

FOREIGN PATENT DOCUMENTS

EP    3203627 A1    8/2017
JP    8-35712 A     2/1996
(Continued)

OTHER PUBLICATIONS

International Search Report and Written Opinion dated Feb. 4, 2020, received for PCT Application PCT/JP2019/045711, Filed on Nov. 21, 2019, 9 pages including English Translation.
(Continued)

*Primary Examiner* — Antony M Paul
(74) *Attorney, Agent, or Firm* — Xsensus LLP

(57) ABSTRACT

A power conversion apparatus includes a main circuit unit, a control unit, a current sensor, and a half-wave rectifier unit. The control unit includes current frequency calculation units and monitoring units. The current frequency calculation units calculate current frequencies based on at least either the rising timing or falling timing of current detection signals half-wave rectified by the half-wave rectifier unit.
(Continued)

The monitoring units monitor the speed of a motor based on the current frequencies calculated by the current frequency calculation units.

10 Claims, 9 Drawing Sheets

(51) Int. Cl.
*H02P 29/024* (2016.01)
*H02M 1/08* (2006.01)

(58) Field of Classification Search
CPC .... H02P 1/265; H02P 1/28; H02P 1/42; H02P 1/46; H02P 1/52; H02P 3/00; H02P 4/00; H02P 5/00; H02P 5/50; H02P 6/00; H02P 6/005; H02P 6/04; H02P 6/08; H02P 6/12; H02P 6/14; H02P 6/17; H02P 6/26; H02P 6/28; H02P 6/34; H02P 7/00; H02P 7/265; H02P 7/2805; H02P 7/2985; H02P 9/00; H02P 11/00; H02P 21/00; H02P 21/0017; H02P 21/0025; H02P 21/14; H02P 21/18; H02P 21/22; H02P 23/00; H02P 23/0022; H02P 23/0031; H02P 23/07; H02P 23/08; H02P 23/14; H02P 23/18; H02P 25/00; H02P 25/062; H02P 25/064; H02P 27/00; H02P 27/026; H02P 27/04; H02P 27/06; H02P 27/045
See application file for complete search history.

(56) References Cited

U.S. PATENT DOCUMENTS

| | | | |
|---|---|---|---|
| 9,768,715 B2 * | 9/2017 | Cho | ................ H02K 15/00 |
| 10,090,791 B2 * | 10/2018 | Saito | ................ G05B 13/0265 |
| 10,148,211 B2 * | 12/2018 | Saito | ................ G05B 13/0265 |
| 2013/0249450 A1 | 9/2013 | Kwon et al. | |
| 2019/0229641 A1 | 7/2019 | Umehara et al. | |

FOREIGN PATENT DOCUMENTS

| | | |
|---|---|---|
| JP | 2011-8642 A | 1/2011 |
| JP | 2016-208655 A | 12/2016 |
| WO | 2016/051552 A1 | 4/2016 |
| WO | 2018/070012 A1 | 4/2018 |
| WO | 2018/159274 A1 | 9/2018 |

OTHER PUBLICATIONS

Decision to Grant a Patent dated Apr. 14, 2020, received for JP Application 2020-515994, 5 pages including English Translation.

* cited by examiner

POWER CONVERSION APPARATUS, DRIVE CONTROL SYSTEM, MACHINE LEARNING APPARATUS, AND MOTOR MONITORING METHOD

CROSS-REFERENCE TO RELATED APPLICATIONS

The present application is based on PCT filing PCT/JP2019/045711, filed Nov. 21, 2019, which claims priority to PCT/JP2019/011139, filed Mar. 18, 2019, the entire contents of each are incorporated herein by reference.

FIELD

The present invention relates to a power conversion apparatus, a drive control system, a machine learning apparatus, and a motor monitoring method for supplying electric power to a motor.

BACKGROUND

In recent years, power conversion apparatuses that supply electric power to motors are required to comply with functional safety standards such as International Electrotechnical Commission (IEC) 61508 or International Organization for Standardization (ISO) 13849, which are international standards. In particular, power conversion apparatuses are required to support safe speed monitoring (Safety Limited Speed (SLS)), which is one of the functional safety standards.

Safe speed monitoring is a function of monitoring that a specified speed limit value is not exceeded. In a power conversion apparatus that supports such safe speed monitoring, when the speed of a motor exceeds the specified speed limit value, a gate drive signal of the power conversion apparatus is turned off to stop power supply to the motor and ensure safety.

When the speed of a motor is monitored in this type of power conversion apparatus by use of an external detector such as an encoder, cost increases and wiring for connecting the external detector becomes complicated. Therefore, regarding such a power conversion apparatus, a technique for monitoring the speed of a motor based on a current value detected by a current sensor has been proposed. For example, Patent Literature 1 discloses a technique for detecting, with a current sensor, a current value that is a value of current supplied to a motor and monitoring the speed of the motor based on the current value.

CITATION LIST

Patent Literature

Patent Literature 1: WO 2016/051552 A

SUMMARY

Technical Problem

However, Patent Literature 1 above merely describes monitoring the speed of the motor based on the current value detected by the current sensor, and proposes no specific measure.

The present invention has been made in view of the above, and an object of the present invention is to obtain a power conversion apparatus capable of performing safe speed monitoring by using a current sensor with a simple configuration.

Solution to Problem

A power conversion apparatus according to an aspect of the present invention includes: a main circuit unit to convert DC power into AC power, and supply the converted AC power to a motor; a control unit to control the main circuit unit; a current sensor to detect a current supplied from the main circuit unit to the motor; and a half-wave rectifier unit to half-wave rectify a current detection signal output from the current sensor, wherein the control unit includes: a current frequency calculation unit to calculate a current frequency based on at least either a rising timing or a falling timing of the current detection signal half-wave rectified by the half-wave rectifier unit, the current frequency being a frequency of the current; and a monitoring unit to monitor a speed of the motor based on the current frequency calculated by the current frequency calculation unit.

Advantageous Effects of Invention

The power conversion apparatus according to the present invention achieves the effect of enabling safe speed monitoring to be performed by use of the current sensor with a simple configuration.

DESCRIPTION OF EMBODIMENTS

Hereinafter, power conversion apparatuses, drive control systems, a machine learning apparatus, and a motor monitoring method according to embodiments of the present invention will be described in detail with reference to the drawings. Note that the present invention is not limited to the embodiments.

First Embodiment

Figure 1:
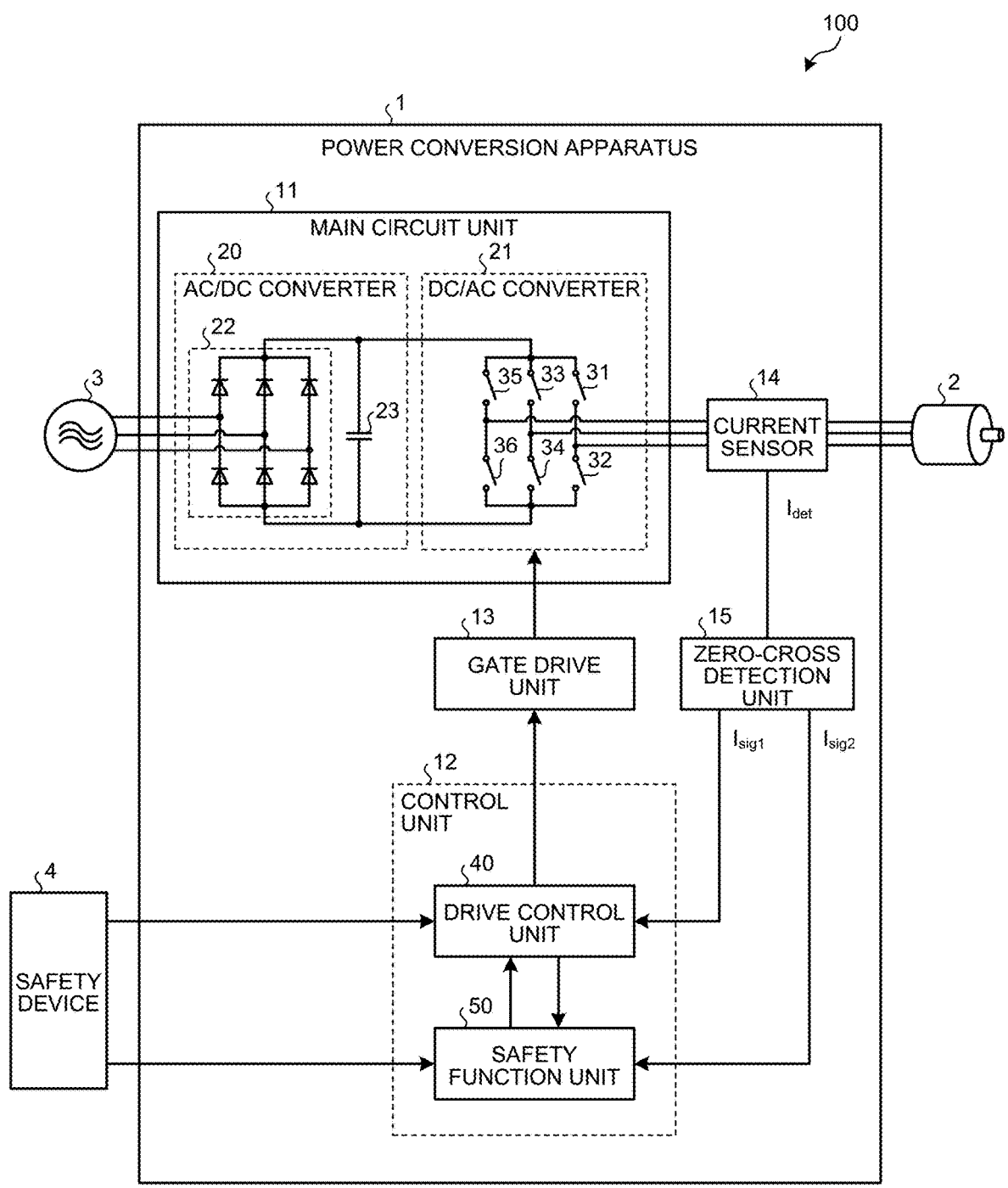
FIG. 1 is a diagram showing a configuration example of a drive control system including a power conversion apparatus according to a first embodiment of the present invention.

FIG. 1 is a diagram showing a configuration example of a drive control system including a power conversion apparatus according to a first embodiment of the present invention. As illustrated in FIG. 1, a drive control system 100 according to the first embodiment includes a power conversion apparatus 1, a motor 2, an AC power source 3, and a safety device 4.

The power conversion apparatus 1 is operated by AC power supplied from the AC power source 3, and controls and drives the motor 2. The power conversion apparatus 1 converts three-phase AC power supplied from the AC power source 3 into AC power having a frequency corresponding to a command signal input from the outside, and supplies the AC power to the motor 2. For example, when the motor 2 is a three-phase AC motor, the power conversion apparatus 1 can convert the three-phase AC power supplied from the AC power source 3 into a three-phase AC power having a frequency corresponding to a command signal, and supply the three-phase AC power to the motor 2. Note that the AC power source 3 may be a single-phase power source.

The safety device 4 outputs, to the power conversion apparatus 1, a safety signal for putting the motor 2 in a safe state in the drive control system 100. Examples of the types of safety signals include a signal for requesting Safe Torque Off (STO), a signal for requesting Safe Stop 1 (SS1), and a signal for requesting safe speed monitoring (SLS). Hereinafter, a signal for requesting Safe Torque Off may be described as an STO signal, a signal for requesting Safe Stop 1 may be described as an SS1 signal, and a signal for requesting safe speed monitoring may be described as an SLS signal.

The STO signal is a signal for requesting the power conversion apparatus 1, which drives the motor 2, to stop power supply from the power conversion apparatus 1 to the motor 2. The SS1 signal is a signal for requesting the power conversion apparatus 1 to stop power supply to the motor 2 by Safe Torque Off after specified time elapses since the start of deceleration of the motor 2. The SLS signal is a signal for requesting the power conversion apparatus 1 to monitor that the speed of the motor 2 does not exceed a specified speed limit value, and to stop power supply to the motor 2 by Safe Torque Off when the speed of the motor 2 exceeds the specified speed limit value. The STO signal, the SS1 signal, and the SLS signal are, for example, signals for requesting execution of safety functions specified in the international standard IEC 61508-5-1.

The safety device 4 outputs a safety signal to the power conversion apparatus 1 when, for example, an operator's approach to the motor 2, or the like is detected or an emergency stop button is operated. The safety device 4 is, for example, a safety programmable logic controller (PLC) or a safety relay. The safety device 4 is connected to a plurality of devices, and outputs a safety signal when receiving emergency notification from any of these devices. Examples of the plurality of devices include a detection device that detects an operator's approach to the motor 2, or the like and an emergency stop button.

The power conversion apparatus 1 includes a main circuit unit 11, a control unit 12, a gate drive unit 13, a current sensor 14, and a zero-cross detection unit 15. The main circuit unit 11 supplies the motor 2 with AC power for driving the motor 2 based on the three-phase AC power supplied from the AC power source 3. The main circuit unit 11 includes an AC/DC converter 20 and a DC/AC converter 21.

The AC/DC converter 20 converts AC power supplied from the AC power source 3 into DC power. The AC/DC converter 20 includes a three-phase diode bridge 22 and a smoothing capacitor 23. The three-phase diode bridge 22 includes a plurality of three-phase bridge connected diodes. The smoothing capacitor 23 smooths an AC voltage rectified by the three-phase diode bridge 22. Note that the AC/DC converter 20 may include a plurality of three-phase bridge connected switching elements instead of the three-phase diode bridge 22.

The DC/AC converter 21 converts DC power supplied from the AC/DC converter 20 into AC power having a frequency corresponding to a command signal, and outputs the converted AC power to the motor 2. The DC/AC converter 21 includes a plurality of switching elements 31, 32, 33, 34, 35, and 36 that are three-phase bridge connected. Note that examples of the switching elements 31, 32, 33, 34, 35, and 36 include semiconductor switching elements such as metal oxide semiconductor field effect transistors (MOSFETs) and insulated gate bipolar transistors (IGBTs).

The control unit 12 includes a drive control unit 40 and a safety function unit 50. The drive control unit 40 generates a control signal for driving the motor 2, and monitors an anomaly or the like. The safety function unit 50 monitors an anomaly or the like. As will be described below, the drive control unit 40 and the safety function unit 50 achieves redundancy for processing on safety signals by duplication.

The drive control unit 40 generates, for example, a control signal based on a command signal input from the outside, and outputs the generated control signal to the gate drive unit 13. The command signal is, for example, a signal indicating a speed command that specifies the speed of the motor 2. When the command signal is a speed command, the drive control unit 40 generates a control signal for setting the speed of the motor 2 to a speed corresponding to the speed command, and outputs the generated control signal to the gate drive unit 13.

Furthermore, the drive control unit 40 generates a control signal based on the safety signal output from the safety device 4, and outputs the generated control signal to the gate drive unit 13. For example, when the safety signal output from the safety device 4 is an SLS signal, the drive control unit 40 controls the motor 2 so that the speed of the motor 2 does not exceed the specified speed limit value, and also monitors that the speed of the motor 2 does not exceed the specified speed limit value based on a current sign signal $I_{sig1}$ output from the zero-cross detection unit 15. Then, when the speed of the motor 2 exceeds the specified speed limit value, the drive control unit 40 outputs, to the gate drive unit 13, a control signal for turning off the switching elements 31, 32, 33, 34, 35, and 36.

The safety function unit 50 controls the drive control unit 40 based on the safety signal output from the safety device 4. For example, when the safety signal output from the safety device 4 is an SLS signal, the safety function unit 50 monitors that the speed of the motor 2 does not exceed the specified speed limit value based on a current sign signal $I_{sig2}$ output from the zero-cross detection unit 15. Then, when the speed of the motor 2 exceeds the specified speed limit value, the safety function unit 50 causes the drive control unit 40 to execute the Safe Torque Off function.

The gate drive unit 13 generates a plurality of pulse width modulation (PWM) signals for driving the switching elements 31, 32, 33, 34, 35, and 36 based on the control signal output from the drive control unit 40. The gate drive unit 13 outputs each of the generated PWM signals to corresponding one of the switching elements 31, 32, 33, 34, 35, and 36. The PWM signals drive the gates of the switching elements 31, 32, 33, 34, 35, and 36. Thus, the PWM signals are also called gate drive signals.

The current sensor 14 detects an alternating current supplied from the main circuit unit 11 to the motor 2, and outputs a current detection signal $I_{det}$ indicating an analog waveform of the alternating current supplied from the main circuit unit 11 to the motor 2. When the motor 2 is a three-phase AC motor, the current sensor 14 outputs the current detection signal $I_{det}$ indicating an analog waveform of an alternating current supplied to one of the three phases.

The current sensor 14 is a Hall element current sensor including, for example, a magnetic core, a Hall element, and an operational amplifier. The current sensor 14 converts a magnetic field generated around a conductor wire that supplies drive current from the main circuit unit 11 to the motor 2 into a voltage by using the Hall effect, and outputs the converted voltage as the current detection signal $I_{det}$. Note that the current sensor 14 may be a current transformer (CT) type current sensor including, for example, a magnetic core, a secondary winding, and a resistor. Furthermore, the current sensor 14 may include a shunt resistor connected in series between the main circuit unit 11 and the motor 2.

The zero-cross detection unit 15 generates the current sign signals $I_{sig1}$ and $I_{sig2}$ based on the current detection signal $I_{det}$ output from the current sensor 14. Then, the zero-cross detection unit 15 outputs the current sign signal $I_{sig1}$ to the drive control unit 40, and outputs the current sign signal $I_{sig2}$ to the safety function unit 50. The current sign signals $I_{sig1}$ and $I_{sig2}$ are time-series sample sequence signals that each include information on a sign indicating whether drive current is positive or negative, the drive current being obtained by the sampling of the waveform of drive current supplied from the main circuit unit 11 to the motor 2 on a time-series basis.

Figure 2:
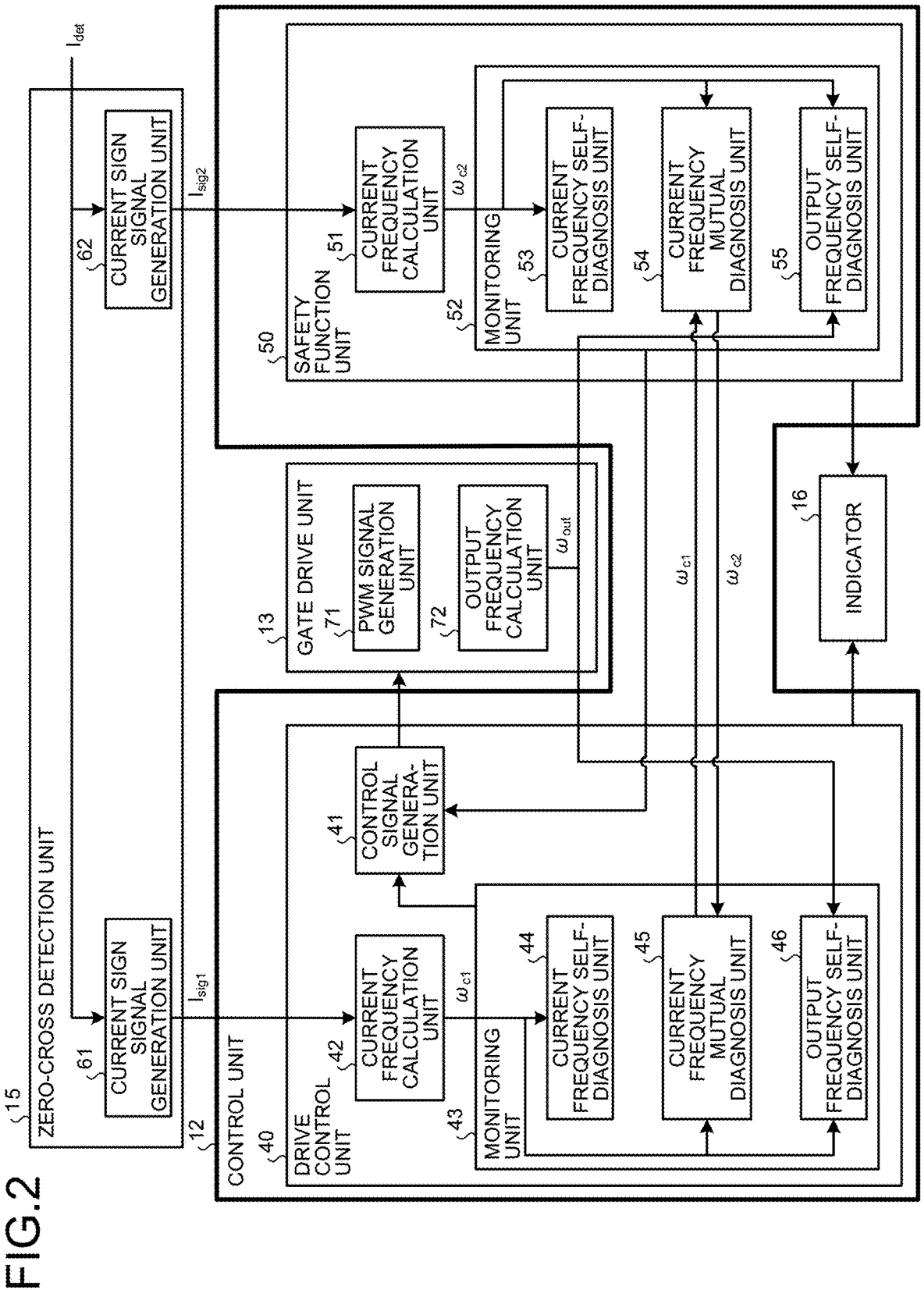
FIG. 2 is a diagram showing configuration examples of a control unit, a gate drive unit, and a zero-cross detection unit in the power conversion apparatus according to the first embodiment.

Next, a description will be given of a configuration example of the power conversion apparatus 1 that performs processing in the case where the safety signal output from the safety device 4 is an SLS signal. FIG. 2 is a diagram showing configuration examples of the control unit, the gate drive unit, and the zero-cross detection unit in the power conversion apparatus according to the first embodiment.

As illustrated in FIG. 2, the zero-cross detection unit 15 includes current sign signal generation units 61 and 62. The current sign signal generation unit 61 generates the current sign signal $I_{sig1}$ based on the current detection signal $I_{det}$ output from the current sensor 14. Similarly, the current sign signal generation unit 62 generates the current sign signal $I_{sig2}$ based on the current detection signal $I_{det}$ output from the current sensor 14. The current sign signal generation unit 61 and the current sign signal generation unit 62 are identical to each other in configuration.

Figure 3:
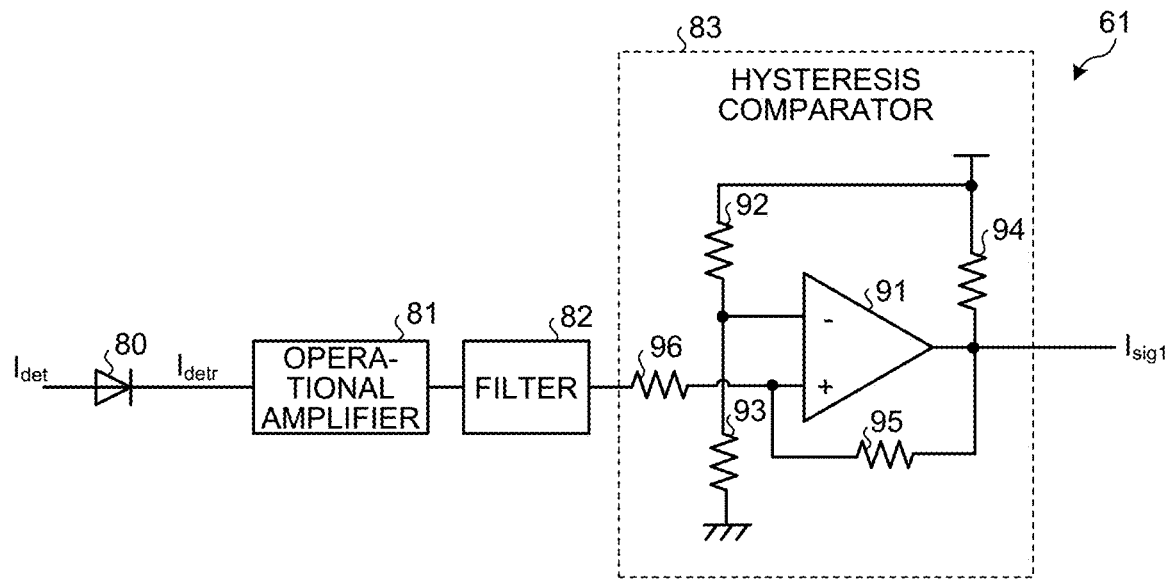
FIG. 3 is a diagram showing a configuration example of a current sign signal generation unit according to the first embodiment.

FIG. 3 is a diagram showing a configuration example of the current sign signal generation unit according to the first embodiment. As illustrated in FIG. 3, the current sign signal generation unit 61 includes a half-wave rectifier unit 80, an operational amplifier 81, a filter 82, and a hysteresis comparator 83.

The half-wave rectifier unit 80 half-wave rectifies the current detection signal $I_{det}$ output from the current sensor 14, and outputs a current detection signal $I_{det}$ that is the half-wave rectified current detection signal $I_{det}$. The half-wave rectifier unit 80 includes, for example, a diode.

The operational amplifier 81 performs voltage amplification on the current detection signal $I_{detr}$ output from the half-wave rectifier unit 80, and outputs the voltage-amplified current detection signal $I_{detr}$. The filter 82 removes noise from the current detection signal $I_{detr}$ voltage-amplified by the operational amplifier 81. The filter 82 is, for example, an RC low-pass filter. Note that the filter 82 may be a bandpass filter.

The hysteresis comparator 83 detects the rising timing and falling timing of the current detection signal $I_{detr}$ output from the filter 82, and outputs the current sign signal $I_{sig1}$ that is a signal indicating results of the detection. The operational amplifier 81, the filter 82, and the hysteresis comparator 83 process the current detection signal $I_{detr}$ having a half-wave rectified waveform. Therefore, the operational amplifier 81, the filter 82, and the hysteresis comparator 83 require no negative power source, and can be driven by a single power source. Therefore, the configuration of the current sign signal generation unit 61 can be simplified.

The hysteresis comparator 83 includes a comparator 91 and resistors 92, 93, 94, 95, and 96. The hysteresis comparator 83 sets the current sign signal $I_{sig1}$ to a higher level when the current detection signal $I_{detr}$ reaches or exceeds a sign inversion threshold value Th1, and sets the current sign signal $I_{sig1}$ to a lower level when the current detection signal $I_{detr}$ equals or falls below a sign inversion threshold value Th2, where Th1>Th2.

Figure 4:
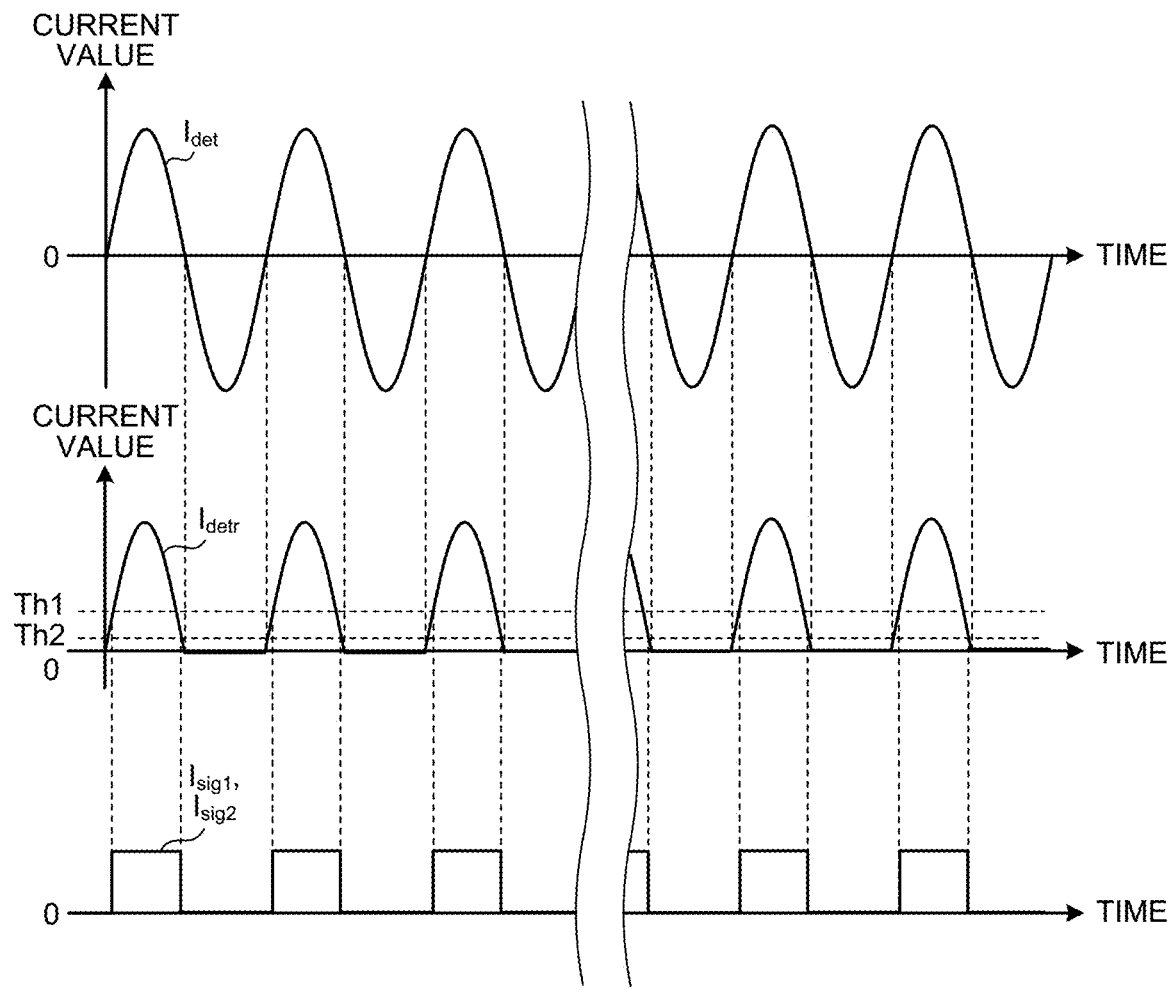
FIG. 4 is a diagram illustrating the relationship between a current detection signal output from a current sensor according to the first embodiment, a current detection signal half-wave rectified by a half-wave rectifier unit, and a current sign signal.

FIG. 4 is a diagram illustrating the relationship between the current detection signal output from the current sensor according to the first embodiment, the current detection signal half-wave rectified by the half-wave rectifier unit, and the current sign signal. As illustrated in FIG. 4, the current detection signal $I_{det}$ is half-wave rectified by the half-wave rectifier unit 80, and the half-wave rectified current detection signal $I_{detr}$ is output to the hysteresis comparator 83.

The hysteresis comparator 83 detects the rising timing and falling timing of the current detection signal $I_{detr}$ output from the half-wave rectifier unit 80. For example, the hysteresis comparator 83 detects the rising timing of the current detection signal $I_{detr}$ at the timing when the current detection signal $I_{detr}$ reaches or exceeds the sign inversion threshold value Th1, and changes the level of the current sign signal $I_{sig1}$ from the lower level to the higher level. Furthermore, the hysteresis comparator 83 detects the falling timing of the current detection signal $I_{detr}$ at the timing when the current detection signal $I_{detr}$ equals or falls below the sign inversion threshold value Th2, and changes the level of the current sign signal $I_{sig1}$ from the higher level to the lower level.

The hysteresis comparator 83 does not detect a ripple of a drive current smaller than the difference between the sign inversion threshold value Th1 and the sign inversion threshold value Th2. Thus, the hysteresis comparator 83 has high noise resistance. Therefore, it is possible to simplify the configuration of the filter 82 in the current sign signal generation unit 61. Note that the configurations of the current sign signal generation units 61 and 62 are not limited to the configuration illustrated in FIG. 3. For example, in the case where the current detection signal $I_{det}$ does not need to be voltage-amplified, the current sign signal generation units 61 and 62 may be configured such that the current sign signal generation units 61 and 62 include no operational amplifier 81.

Furthermore, the configuration of the hysteresis comparator 83 is not limited to the configuration illustrated in FIG. 3. For example, the hysteresis comparator 83 may be configured such that the current sign signal $I_{sig1}$ is set to the lower level when the current detection signal $I_{detr}$ reaches or exceeds the sign inversion threshold value Th1, and the current sign signal $I_{sig1}$ is set to the higher level when the current detection signal $I_{detr}$ equals or falls below the sign inversion threshold value Th2. Furthermore, the relationship between the sign inversion threshold value Th1 and the sign inversion threshold value Th2 may be expressed as Th1<Th2. Moreover, the hysteresis comparator 83 may be a digital circuit instead of an analog circuit.

Returning to FIG. 2, description about the control unit 12 is continued. As illustrated in FIG. 2, the control unit 12 includes the drive control unit 40 and the safety function unit 50. The drive control unit 40 includes a control signal generation unit 41, a current frequency calculation unit 42, and a monitoring unit 43.

The control signal generation unit 41 generates a control signal based on a command signal input from the outside or the safety signal input from the safety device 4. The power conversion apparatus 1 is provided with a current sensor (not illustrated) that is different from the current sensor 14 and detects a three-phase current supplied to the motor 2. The control signal generation unit 41 includes a speed control unit (not illustrated) and a current control unit (not illustrated). The speed control unit controls speed based on the three-phase current detected by the current sensor. The current control unit controls current based on the three-phase current detected by the current sensor.

For example, the speed control unit (not illustrated) can estimate the speed of the motor 2 based on the three-phase current detected by the current sensor, and generate a current command such that the estimated speed of the motor 2 matches a speed command. Furthermore, the current control unit (not illustrated) can generate a control signal such that the current command matches a q-axis current in a dq coordinate system obtained from the three-phase current detected by the current sensor.

The current frequency calculation unit 42 calculates a current frequency $\omega_{c1}$ that is the frequency of current supplied from the main circuit unit 11 to the motor 2, based on the current sign signal $I_{sig1}$ output from the zero-cross detection unit 15. Specifically, the current frequency calculation unit 42 has a pulse counter function, and counts both rising and falling edges of the current sign signal $I_{sig1}$. The current frequency calculation unit 42 samples the count values at preset intervals, and calculates the current frequency $\omega_{c1}$ from the sampled count values. Note that the current frequency calculation unit 42 may be configured such that the current frequency calculation unit 42 calculates the current frequency $\omega_{c1}$ based on the result of counting only the rising or falling edges of the current sign signal $I_{sig1}$, instead of calculating the current frequency $\omega_{c1}$ based on the result of counting both the rising and falling edges of the current sign signal $I_{sig1}$.

The monitoring unit 43 monitors the speed of the motor 2 based on the current frequency $\omega_{c1}$ calculated by the current frequency calculation unit 42, and determines, for example, whether to execute the Safe Torque Off based on a result of the monitoring. Specifically, the monitoring unit 43 causes the control signal generation unit 41 to execute the Safe Torque Off when it is determined, based on the current frequency $\omega_{c1}$ calculated by the current frequency calculation unit 42, that the control unit 12 is not controlling the motor 2 according to the safety signal. The monitoring unit 43 includes a current frequency self-diagnosis unit 44, a current frequency mutual diagnosis unit 45, and an output frequency self-diagnosis unit 46.

The current frequency self-diagnosis unit 44 sets, as the speed of the motor 2, the current frequency $\omega_{c1}$ calculated by the current frequency calculation unit 42 or a value directly proportional to the current frequency $\omega_{c1}$, and determines whether the speed of the motor 2 is equal to or less than a specified speed limit value $\omega_{th}$ set in advance. When the current frequency self-diagnosis unit 44 determines that the current frequency $\omega_{c1}$ or the value directly proportional to the current frequency $\omega_{c1}$ is not equal to or less than the specified speed limit value $\omega_{th}$, the current frequency self-diagnosis unit 44 causes the control signal generation unit 41 to output a control signal for executing the Safe Torque Off to the gate drive unit 13.

Note that the current frequency $\omega_{c1}$ is a value directly proportional to the speed of the motor 2 per the number of poles of a stator in the motor 2, and can be treated as an estimate value of the speed of the motor 2. In the case where the current frequency self-diagnosis unit 44 determines whether the current frequency $\omega_{c1}$ is equal to or less than the specified speed limit value $\omega_{th}$, the specified speed limit value $\omega_{th}$ is a limit value corresponding to the speed of the motor 2 per the number of poles of the stator in the motor 2. Furthermore, the value directly proportional to the current frequency $\omega_{c1}$ is, for example, a value given by the current frequency $\omega_{c1}$ multiplied by 2 and divided by the number of poles of the stator in the motor 2, and can be treated as an estimate value of the speed [rps] of the motor 2. In the case where the current frequency self-diagnosis unit 44 determines whether the value directly proportional to the current frequency $\omega_{c1}$ is equal to or less than the specified speed limit value $\omega_{th}$, the specified speed limit value $\omega_{th}$ is an upper limit corresponding to the speed [rps] of the motor 2.

The gate drive unit 13 includes a PWM signal generation unit 71 that generates the PWM signals to be output to the switching elements 31, 32, 33, 34, 35, and 36, based on the control signal output from the control signal generation unit 41. When the control signal for executing the Safe Torque Off is output from the control signal generation unit 41, the PWM signal generation unit 71 turns off the PWM signals for the switching elements 31, 32, 33, 34, 35, and 36. As a result, power supply from the main circuit unit 11 to the motor 2 is stopped.

Note that when the current frequency self-diagnosis unit 44 determines that the current frequency $\omega_{c1}$ or the value directly proportional to the current frequency $\omega_{c1}$ is not equal to or less than the specified speed limit value $\omega_{th}$, the current frequency self-diagnosis unit 44 can provide alarm display on an indicator 16. The indicator 16 is a display such as a liquid crystal display (LCD) or an alarm lamp. In the case where the indicator 16 is an LCD, the current frequency self-diagnosis unit 44 can display, on the indicator 16, character information or the like to the effect that the current frequency $\omega_{c1}$ or the value directly proportional to the current frequency $\omega_{c1}$ is not equal to or less than the specified speed limit value $\omega_{th}$. Furthermore, the current frequency self-diagnosis unit 44 can also display, on the indicator 16, graph information indicating the temporal deviation of the current frequency $\omega_{c1}$ or the value directly proportional to the current frequency $\omega_{c1}$ and the specified speed limit value $\omega_{th}$. Note that when the current frequency self-diagnosis unit 44 determines that the current frequency $\omega_{c1}$ or the value directly proportional to the current frequency $\omega_{c1}$ is not equal to or less than the specified speed limit value $\omega_{th}$, the current frequency self-diagnosis unit 44 can also cause a speaker (not illustrated) to output an alarm sound.

Furthermore, when the current frequency self-diagnosis unit 44 determines that the current frequency $\omega_{c1}$ or the value directly proportional to the current frequency $\omega_{c1}$ is not equal to or less than the specified speed limit value $\omega_{th}$, the current frequency self-diagnosis unit 44 can also cause the control signal generation unit 41 to output, to the gate drive unit 13, a control signal for reducing power supply to the motor 2 instead of the control signal for executing the Safe Torque Off. As a result, electric power to be supplied to the motor 2 can be reduced.

The current frequency mutual diagnosis unit 45 performs a mutual determination process based on the current frequency $\omega_{c1}$ calculated by the current frequency calculation unit 42 and a current frequency $\omega_{c2}$ calculated by the safety function unit 50, which will be described below. Specifically, the current frequency mutual diagnosis unit 45 determines whether the difference between the current frequency $\omega_{c1}$ and the current frequency $\omega_{c2}$ is within a specified range $R_{th1}$ set in advance. When the current frequency mutual diagnosis unit 45 determines that the difference between the current frequency $\omega_{c1}$ and the current frequency $\omega_{c2}$ is outside the specified range $R_{th1}$, the current frequency mutual diagnosis unit 45 causes the control signal generation unit 41 to output a control signal for executing the Safe Torque Off to the gate drive unit 13. As a result, power supply to the motor 2 is stopped.

The output frequency self-diagnosis unit 46 determines whether the difference between the current frequency $\omega_{c1}$ calculated by the current frequency calculation unit 42 and an output frequency $\omega_{out}$ calculated by the gate drive unit 13 is within a specified range $R_{th2}$ set in advance. The gate drive unit 13 includes an output frequency calculation unit 72 that calculates the output frequency $\omega_{out}$. The output frequency self-diagnosis unit 46 acquires, from the output frequency calculation unit 72, information on the output frequency $\omega_{out}$ calculated by the output frequency calculation unit 72.

The output frequency $\omega_{out}$ is the frequency of a drive voltage to be output from the DC/AC converter 21 of the main circuit unit 11 to the motor 2 under the control of the gate drive signals for the switching elements 31, 32, 33, 34, 35, and 36. The output frequency calculation unit 72 calculates the output frequency $\omega_{out}$ based on the control signal generated by the control signal generation unit 41. For example, in the case where the control signal includes a three-phase coordinate voltage command, the frequency of the voltage command can be calculated as the output frequency $\omega_{out}$.

When the output frequency self-diagnosis unit 46 determines that the difference between the current frequency $\omega_{c1}$ and the output frequency $\omega_{out}$ is outside the specified range $R_{th2}$, the output frequency self-diagnosis unit 46 causes the control signal generation unit 41 to output a control signal for executing the Safe Torque Off to the gate drive unit 13. As a result, power supply to the motor 2 is stopped.

Note that as with the current frequency self-diagnosis unit 44, the current frequency mutual diagnosis unit 45 and the output frequency self-diagnosis unit 46 can provide alarm display on the indicator 16 or cause the speaker (not illustrated) to output an alarm sound when causing the control signal generation unit 41 to execute the Safe Torque Off. Furthermore, as with the current frequency self-diagnosis unit 44, the current frequency mutual diagnosis unit 45 and the output frequency self-diagnosis unit 46 can also cause the control signal generation unit 41 to output, to the gate drive unit 13, a control signal for reducing power supply to the motor 2 instead of the control signal for executing the Safe Torque Off.

The safety function unit 50 includes a current frequency calculation unit 51 and a monitoring unit 52. The current frequency calculation unit 51 calculates the current frequency $\omega_{c2}$ that is the frequency of the current supplied from the main circuit unit 11 to the motor 2, based on the current sign signal $I_{sig2}$ output from the zero-cross detection unit 15. As with the current frequency calculation unit 42, the current frequency calculation unit 51 has a pulse counter function, and counts both rising and falling edges of the current sign signal $I_{sig2}$. The current frequency calculation unit 51 samples the count values at preset intervals, and calculates, as the speed of the motor 2, the current frequency $\omega_{c2}$ from the sampled count values. Note that the current frequency calculation unit 51 may be configured such that the current frequency calculation unit 51 calculates the current frequency $\omega_{c2}$ based on the result of counting only the rising or falling edges of the current sign signal $I_{sig2}$, instead of calculating the current frequency $\omega_{c2}$ based on the result of counting both the rising and falling edges of the current sign signal $I_{sig2}$.

The monitoring unit 52 determines whether to execute the Safe Torque Off based on the current frequency $\omega_{c2}$ calculated by the current frequency calculation unit 51. Specifically, the monitoring unit 52 causes the control signal generation unit 41 to execute the Safe Torque Off when it is determined, based on the current frequency $\omega_{c2}$ calculated by the current frequency calculation unit 51, that the control unit 12 is not controlling the motor 2 according to the safety signal. The monitoring unit 52 includes a current frequency self-diagnosis unit 53, a current frequency mutual diagnosis unit 54, and an output frequency self-diagnosis unit 55.

The current frequency self-diagnosis unit 53 sets, as the speed of the motor 2, the current frequency $\omega_{c2}$ calculated by the current frequency calculation unit 51 or a value directly proportional to the current frequency $\omega_{c2}$, and determines whether the speed of the motor 2 is equal to or less than the specified speed limit value $\omega_{th}$ set in advance. When the current frequency self-diagnosis unit 53 determines that the current frequency $\omega_{c2}$ or the value directly proportional to the current frequency $\omega_{c2}$ is not equal to or less than the specified speed limit value $\omega_{th}$, the current frequency self-diagnosis unit 53 causes the control signal generation unit 41 to output a control signal for executing the Safe Torque Off to the gate drive unit 13. As a result, power supply to the motor 2 is stopped.

Furthermore, as with the current frequency self-diagnosis unit 44, the current frequency self-diagnosis unit 53 can provide alarm display on the indicator 16 or cause the speaker (not illustrated) to output an alarm sound when the current frequency self-diagnosis unit 53 determines that the current frequency $\omega_{c2}$ or the value directly proportional to the current frequency $\omega_{c2}$ is not equal to or less than the specified speed limit value $\omega_{th}$. Furthermore, as with the current frequency self-diagnosis unit 44, the current frequency self-diagnosis unit 53 can also cause the control signal generation unit 41 to output, to the gate drive unit 13, a control signal for reducing power supply to the motor 2 instead of the control signal for executing the Safe Torque Off when the current frequency self-diagnosis unit 53 determines that the current frequency $\omega_{c2}$ or the value directly proportional to the current frequency $\omega_{c2}$ is not equal to or less than the specified speed limit value $\omega_{th}$.

Note that the current frequency $\omega_{c2}$ is a value directly proportional to the speed of the motor 2 per the number of poles of the stator in the motor 2, and can be treated as an estimate value of the speed of the motor 2, as with the current frequency $\omega_{c1}$. In the case where the current frequency self-diagnosis unit 53 determines whether the current frequency $\omega_{c2}$ is equal to or less than the specified speed limit value $\omega_{th}$, the specified speed limit value $\omega_{th}$ is a limit value corresponding to the speed of the motor 2 per the number of poles of the stator in the motor 2. Furthermore, the value directly proportional to the current frequency $\omega_{c2}$ is, for example, a value given by the current frequency $\omega_{c2}$ multiplied by 2 and divided by the number of poles of the stator in the motor 2, and can be treated as an estimate value of the speed [rps] of the motor 2. In the case where the current frequency self-diagnosis unit 53 determines whether the value directly proportional to the current frequency $\omega_{c2}$ is equal to or less than the specified speed limit value $\omega_{th}$, the specified speed limit value $\omega_{th}$ is an upper limit corresponding to the speed [rps] of the motor 2.

As with the current frequency mutual diagnosis unit 45, the current frequency mutual diagnosis unit 54 performs a mutual determination process based on the current frequencies $\omega_{c1}$ and $\omega_{c2}$. Specifically, the current frequency mutual diagnosis unit 54 determines whether the difference between the current frequency $\omega_{c1}$ and the current frequency $\omega_{c2}$ is within the specified range $R_{th1}$ set in advance. When the current frequency mutual diagnosis unit 54 determines that the difference between the current frequency $\omega_{c1}$ and the current frequency $\omega_{c2}$ is outside the specified range $R_{th1}$, the current frequency mutual diagnosis unit 54 causes the control signal generation unit 41 to output a control signal for executing the Safe Torque Off to the gate drive unit 13. As a result, power supply to the motor 2 is stopped.

The output frequency self-diagnosis unit 55 determines whether the difference between the current frequency $\omega_{c2}$ and the output frequency $\omega_{out}$ is within the specified range $R_{th2}$ set in advance. When the output frequency self-diagnosis unit 55 determines that the difference between the current frequency $\omega_{c2}$ and the output frequency $\omega_{out}$ is outside the specified range $R_{th2}$, the output frequency self-diagnosis unit 55 causes the control signal generation unit 41 to output a control signal for executing the Safe Torque Off to the gate drive unit 13. As a result, power supply to the motor 2 is stopped.

Note that as with the current frequency self-diagnosis unit 53, the current frequency mutual diagnosis unit 54 and the output frequency self-diagnosis unit 55 can provide alarm display on the indicator 16 or cause the speaker (not illustrated) to output an alarm sound when causing the control signal generation unit 41 to execute the Safe Torque Off. Furthermore, as with the current frequency self-diagnosis unit 53, the current frequency mutual diagnosis unit 54 and the output frequency self-diagnosis unit 55 can also cause the control signal generation unit 41 to output, to the gate drive unit 13, a control signal for reducing power supply to the motor 2 instead of the control signal for executing the Safe Torque Off.

Figure 5:
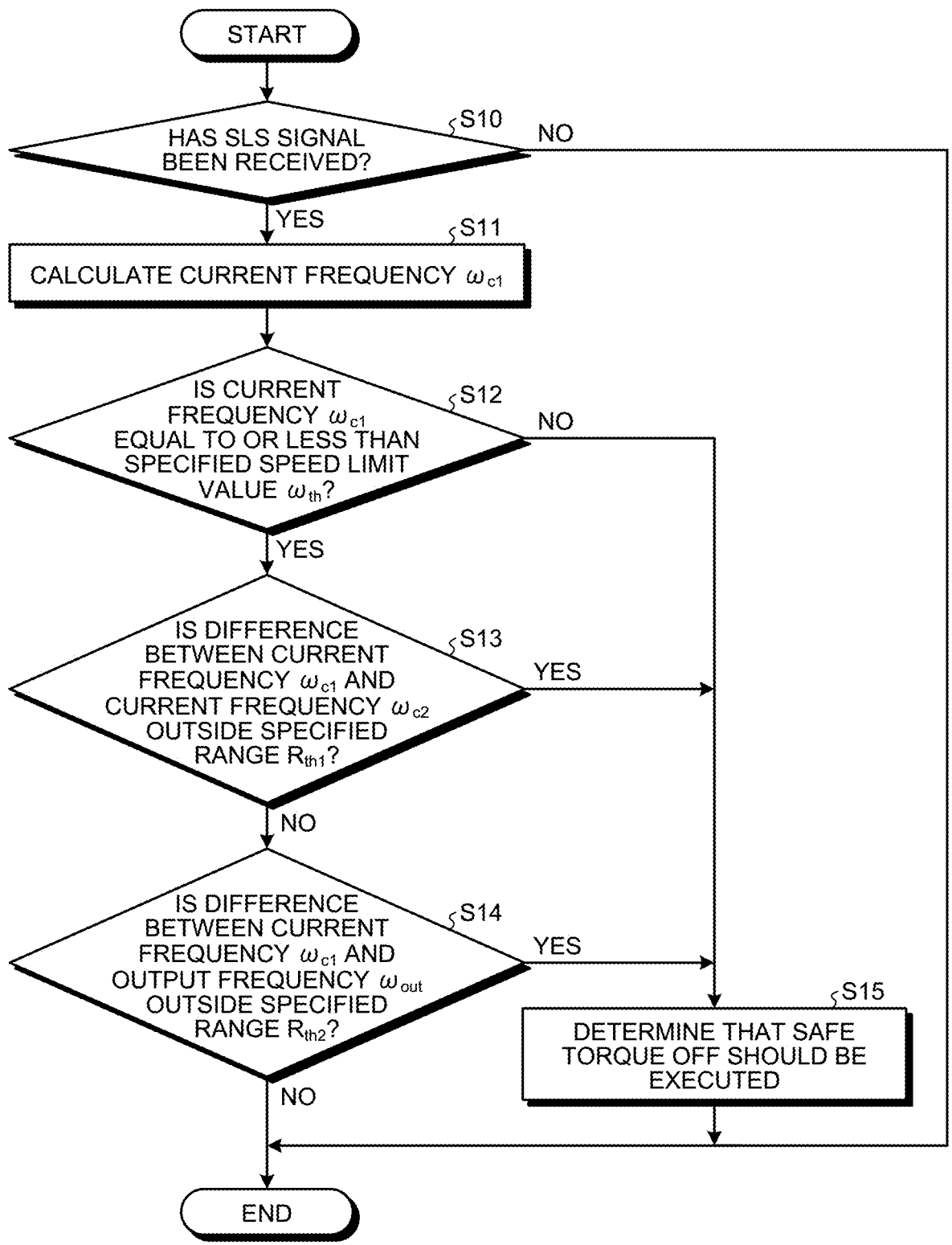
FIG. 5 is a flowchart showing an example of processing to be performed by a drive control unit of the control unit according to the first embodiment.

Next, operation of the safe speed monitoring and the Safe Torque Off in the control unit 12 will be described with reference to a flowchart. FIG. 5 is a flowchart showing an example of processing to be performed by the drive control unit of the control unit according to the first embodiment.

As illustrated in FIG. 5, the drive control unit 40 determines whether an SLS signal has been received from the safety device 4 (step S10). When the drive control unit 40 determines that the SLS signal has been received (step S10: Yes), the drive control unit 40 calculates the current frequency $\omega_{c1}$ (step S11). The drive control unit 40 determines whether the current frequency $\omega_{c1}$ is equal to or less than the specified speed limit value $\omega_{th}$ (step S12). When the drive control unit 40 determines that the current frequency $\omega_{c1}$ is equal to or less than the specified speed limit value $\omega_{th}$ (step S12: Yes), the drive control unit 40 determines whether the difference between the current frequency $\omega_{c1}$ and the current frequency $\omega_{c2}$ is outside the specified range $R_{th1}$ (step S13).

When the drive control unit 40 determines that the difference between the current frequency $\omega_{c1}$ and the current frequency $\omega_{c2}$ is not outside the specified range $R_{th1}$ (step S13: No), the drive control unit 40 determines whether the difference between the current frequency $\omega_{c1}$ and the output frequency $\omega_{out}$ is outside the specified range $R_{th2}$ (step S14). When it is determined that the current frequency $\omega_{c1}$ is not equal to or less than the specified speed limit value $\omega_{th}$ (step S12: No), when it is determined that the difference between the current frequency $\omega_{c1}$ and the current frequency $\omega_{c2}$ is outside the specified range $R_{th1}$ (step S13: Yes), or when it is determined that the difference between the current frequency $\omega_{c1}$ and the output frequency $\omega_{out}$ is outside the specified range $R_{th2}$ (step S14: Yes), the drive control unit 40 determines that the Safe Torque Off should be executed, and causes the control unit 12 to execute the Safe Torque Off (step S15).

When the processing of step S15 is completed, when it is determined that the SLS signal has not been received (step S10: No), or when it is determined that the difference between the current frequency $\omega_{c1}$ and the output frequency $\omega_{out}$ is not outside the specified range $R_{th2}$ (step S14: No), the drive control unit 40 terminates the process illustrated in FIG. 5. Note that the processing to be performed by the safety function unit 50 of the control unit 12 is the same as the processing to be performed by the drive control unit 40 illustrated in FIG. 5. The processing to be performed by the safety function unit 50 is different from the processing to be performed by the drive control unit 40 illustrated in FIG. 5 in that the safety function unit 50 uses the current frequency $\omega_{c2}$ in place of the current frequency $\omega_{c1}$ in steps S11, S12, and S14 illustrated in FIG. 5.

Figure 6:
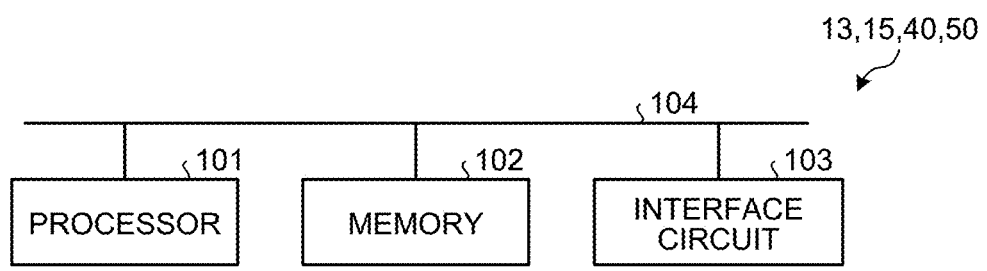
FIG. 6 is a diagram showing an example of hardware configurations of the gate drive unit, the zero-cross detection unit, the drive control unit, and a safety function unit according to the first embodiment.

FIG. 6 is a diagram showing an example of hardware configurations of the gate drive unit, the zero-cross detection unit, the drive control unit, and the safety function unit according to the first embodiment. As illustrated in FIG. 6, each of the gate drive unit 13, the zero-cross detection unit 15, the drive control unit 40, and the safety function unit 50 includes a computer including a processor 101, a memory 102, and an interface circuit 103. The processor 101, the memory 102, and the interface circuit 103 can transmit and receive data to and from each other via a bus 104.

A part of the PWM signal generation unit 71 of the gate drive unit 13 is implemented by the interface circuit 103. The processor 101 in the gate drive unit 13 executes the functions of the PWM signal generation unit 71 and the output frequency calculation unit 72 by reading and executing programs stored in the memory 102. The processor 101 in the zero-cross detection unit 15 executes the functions of the current sign signal generation units 61 and 62 by reading and executing programs stored in the memory 102. The processor 101 in the drive control unit 40 executes the functions of the control signal generation unit 41, the current frequency calculation unit 42, and the monitoring unit 43 by reading and executing programs stored in the memory 102. Furthermore, the processor 101 in the safety function unit 50 executes the functions of the current frequency calculation unit 51 and the monitoring unit 52 by reading and executing programs stored in the memory 102. Note that the counting of both the rising and falling edges of the current sign signals $I_{sig1}$ and $I_{sig2}$ in the current frequency calculation units 42 and 51 described above is implemented by the pulse counter functions of the respective processors 101. Furthermore, the current frequency calculation units 42 and 51 may be configured such that the respective processors 101 count the number of times inversions of the current sign signals $I_{sig1}$ and $I_{sig2}$ occur by using input ports of the respective interface circuits 103.

The processor 101 is an example of a processing circuit, and includes one or more of a central processing unit (CPU), a digital signal processor (DSP), and a system large scale integration (LSI). The memory 102 includes one or more of a random access memory (RAM), a read only memory (ROM), a flash memory, an erasable programmable read only memory (EPROM), and an electrically erasable programmable read only memory (EEPROM) (registered trademark). Furthermore, the memory 102 includes a recording medium on which a computer-readable program has been recorded. Such a recording medium includes one or more of a non-volatile or volatile semiconductor memory, a magnetic disk, a flexible memory, an optical disk, a compact disk, and a Digital Versatile Disc (DVD). Note that the control unit 12 may include integrated circuits such as an application specific integrated circuit (ASIC) and a field-programmable gate array (FPGA).

As described above, the drive control unit 40 and the safety function unit 50 each include the processor 101 and the programs operating on the processor 101, and the drive control unit 40 and the safety function unit 50 function independently of each other.

As described above, the power conversion apparatus 1 according to the first embodiment includes the main circuit unit 11, the control unit 12, the current sensor 14, and the half-wave rectifier unit 80. The main circuit unit 11 converts DC power into AC power, and supplies the converted AC power to the motor 2. The control unit 12 controls the main circuit unit 11. The current sensor 14 detects the current supplied from the main circuit unit 11 to the motor 2. The half-wave rectifier unit 80 half-wave rectifies the current detection signal $I_{det}$ output from the current sensor 14. The control unit 12 includes the current frequency calculation units 42 and 51 and the monitoring units 43 and 52. The current frequency calculation units 42 and 51 detect the current frequencies $\omega_{c1}$ and $\omega_{c2}$, respectively, based on at least either the rising timing or falling timing of the current detection signal $I_{det}$, that is the current detection signal $I_{det}$ half-wave rectified by the half-wave rectifier unit 80. The monitoring units 43 and 52 monitor the speed of the motor 2 based on the current frequencies $\omega_{c1}$ and $\omega_{c2}$ calculated by the current frequency calculation units 42 and 51, respectively. As a result, the power conversion apparatus 1 can perform safe speed monitoring without using an external detector such as an encoder. In addition, the power conversion apparatus 1 processes the current detection signal $I_{det}$ with a half-wave rectified waveform. Therefore, a negative power source is not required, so that safe speed monitoring can be performed with a simple configuration.

Furthermore, the power conversion apparatus 1 includes the hysteresis comparator 83 that compares the rising timing and falling timing of the current detection signal $I_{det}$ half-wave rectified by the half-wave rectifier unit 80 with different threshold values. The current frequency calculation units 42 and 51 calculate the current frequencies $\omega_{c1}$ and $\omega_{c2}$, respectively, based on the rising timing obtained from a result of the comparison performed by the hysteresis comparator 83. As a result, for example, the power conversion apparatus 1 does not detect a ripple of the drive current smaller than the difference between the sign inversion threshold value Th1 and the sign inversion threshold value Th2 described above. Thus, noise resistance can be improved. Therefore, for example, the configuration of the filter 82 can be simplified in each of the current sign signal generation units 61 and 62.

Furthermore, when the current frequencies $\omega_{c1}$ and $\omega_{c2}$ calculated by the current frequency calculation units 42 and 51, respectively, or the values directly proportional to the current frequencies $\omega_{c1}$ and $\omega_{c2}$ exceed the specified speed limit value $\omega_{th}$, the monitoring units 43 and 52 can stop supplying AC power from the main circuit unit 11 to the motor 2. As a result, the power conversion apparatus 1 can stop the motor 2 when the speed of the motor 2 exceeds the specified speed limit value.

Furthermore, the monitoring units 43 and 52 stop power supply from the main circuit unit 11 to the motor 2 when the difference between the current frequencies $\omega_{c1}$ and $\omega_{c2}$ calculated by a plurality of the current frequency calculation units 42 and 51, respectively, is outside the specified range $R_{th1}$ set in advance. As a result, the power conversion apparatus 1 can perform mutual diagnosis between the redundant monitoring units 43 and 52, so that it is possible to accurately detect that the control unit 12 is not controlling the motor 2 according to the safety signal.

Furthermore, the power conversion apparatus 1 includes the PWM signal generation unit 71 and the output frequency calculation unit 72. The PWM signal generation unit 71 generates the PWM signals for performing PWM control of the main circuit unit 11. The output frequency calculation unit 72 calculates the output frequency $\omega_{out}$, which is the frequency of the AC voltage output from the main circuit unit 11 to the motor 2. The monitoring units 43 and 52 stop power supply from the main circuit unit 11 to the motor 2 when the differences between the current frequencies $\omega_{c1}$ and $\omega_{c2}$ calculated by the current frequency calculation units 42 and 51, respectively, and the output frequency $\omega_{out}$ calculated by the output frequency calculation unit 72 are outside the specified range $R_{th2}$ set in advance. As a result, the power conversion apparatus 1 can accurately detect that the control unit 12 is not controlling the motor 2 according to the safety signal.

Second Embodiment

A power conversion apparatus according to a second embodiment is different from the power conversion apparatus 1 according to the first embodiment in that the power conversion apparatus according to the second embodiment calculates a current frequency by using a calculation model created by machine learning. In the following, constituent elements having the same functions as those in the first embodiment will be designated by the same reference numerals and description thereof will be omitted, and differences from the drive control system 100 of the first embodiment will be mainly described.

Figure 7:
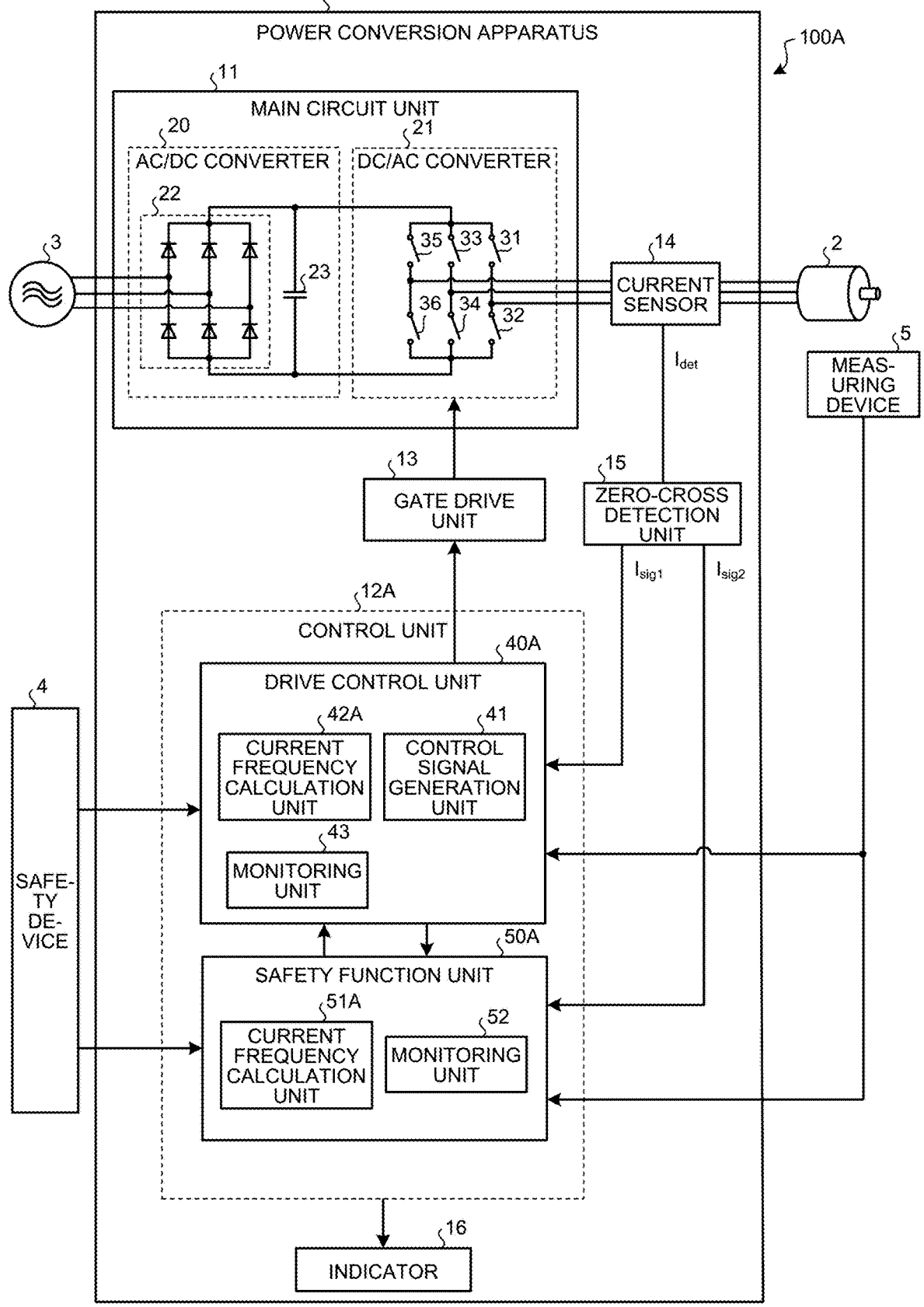
FIG. 7 is a diagram showing a configuration example of a drive control system including a power conversion apparatus according to a second embodiment.

FIG. 7 is a diagram showing a configuration example of a drive control system including the power conversion apparatus according to the second embodiment. As illustrated in FIG. 7, a drive control system 100A according to the second embodiment includes a power conversion apparatus 1A, the motor 2, the AC power source 3, the safety device 4, and a measuring device 5. The measuring device 5 is an example of an external measuring device.

The power conversion apparatus 1A is different from the power conversion apparatus 1 in that the power conversion apparatus 1A includes a control unit 12A including a drive control unit 40A and a safety function unit 50A in place of the control unit 12 including the drive control unit 40 and the safety function unit 50. The drive control unit 40A is different from the drive control unit 40 in that the drive control unit 40A includes a current frequency calculation unit 42A in place of the current frequency calculation unit 42. The current frequency calculation unit 42A calculates the current frequency $\omega_{c1}$ from the current sign signal $I_{sig1}$ by using a calculation model created by machine learning.

Furthermore, the safety function unit 50A is different from the safety function unit 50 in that the safety function unit 50A includes a current frequency calculation unit 51A in place of the current frequency calculation unit 51. The current frequency calculation unit 51A calculates the current frequency $\omega_{c2}$ from the current sign signal $I_{sig2}$ by using a calculation model created by machine learning. The current frequency calculation unit 42A and the current frequency calculation unit 51A have the same configuration. Therefore, the configuration of the current frequency calculation unit 42A will be specifically described below, and description of the configuration of the current frequency calculation unit 51A will be omitted.

The measuring device 5 measures alternating current supplied from the power conversion apparatus 1A to the motor 2 or the speed of the motor 2 at preset intervals, and outputs measured values that are data indicating measurement results to the power conversion apparatus 1A. The measuring device 5 is, for example, a measuring instrument such as a data logger having a current detection function. For example, the measuring device 5 outputs, as a measured value, current waveform data to the power conversion apparatus 1A. The current waveform data indicate the waveform of the alternating current supplied from the power conversion apparatus 1A to the motor 2. In the case where, for example, the DC/AC converter 21 includes a power semiconductor chip, the current waveform data are data obtained by a probe or the like of the measuring device 5 directly attached to the power semiconductor chip, and are data showing actual current waveform not affected by noise caused by measurement.

Furthermore, the measuring device 5 may be an encoder attached to the motor 2. In this case, the measuring device 5 detects the speed of the motor 2. The speed of the motor 2 is the mechanical angular speed of the motor 2, but may be the electric angular speed of the motor 2. The measuring device 5 detects, for example, a rotational position of the rotating shaft of the motor 2, and detects the speed of the motor 2 from a change in the detected rotational position. The measuring device 5 outputs, as a measured value, speed data to the power conversion apparatus 1A. The speed data indicate the detected speed of the motor 2.

Figure 8:
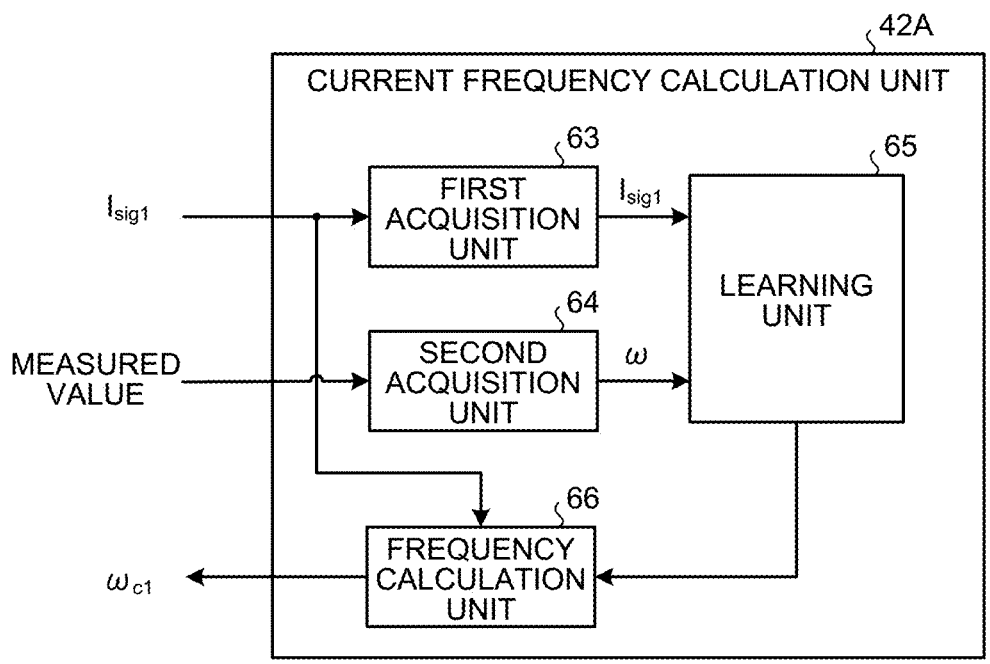
FIG. 8 is a diagram showing a configuration example of a current frequency calculation unit according to the second embodiment.

FIG. 8 is a diagram showing a configuration example of the current frequency calculation unit according to the second embodiment. As illustrated in FIG. 8, the current frequency calculation unit 42A includes a first acquisition unit 63, a second acquisition unit 64, a learning unit 65, and a frequency calculation unit 66.

The first acquisition unit 63 acquires, as a state variable, the current sign signal $I_{sig1}$ output from the zero-cross detection unit 15. The second acquisition unit 64 acquires measured values from the measuring device 5 at preset intervals via a network by wire communication or wireless communication. For example, the second acquisition unit 64 acquires, as measured values, the speed data or the current waveform data from the measuring device 5.

The second acquisition unit 64 calculates a current frequency $\omega$ based on the acquired measured values. The current frequency $\omega$ is the frequency of the alternating current supplied from the power conversion apparatus 1A to the motor 2. In the case where the acquired measured values are the current waveform data, the second acquisition unit 64 calculates the current frequency $\omega$ by performing fast Fourier transform processing on the current waveform data. In the case where the acquired measured values are the speed data, the second acquisition unit 64 calculates the current frequency $\omega$ based on the speed data and the number of poles of the motor 2.

The learning unit 65 creates a calculation model M by performing learning processing according to a data set created based on combinations of the current sign signals $I_{sig1}$ acquired by the first acquisition unit 63 and the current frequencies $\omega$ calculated by the second acquisition unit 64. The calculation model created by the learning unit 65 is a calculation model that outputs the current frequency $\omega_{c1}$ by using the current sign signal $I_{sig1}$ as input data.

For example, the learning unit 65 performs learning processing based on so-called supervised learning according to a neural network model, and creates the calculation model M including a neural network. Here, supervised learning refers to a method of creating a calculation model for estimating a result from an input, based on machine learning by providing a data set of inputs and results in large quantity to a learning apparatus so as to cause the learning apparatus to learn features in the data set.

The neural network includes an input layer including a plurality of neurons, an intermediate layer including a plurality of neurons, and an output layer including a plurality of neurons. A single intermediate layer may be provided. Alternatively, three or more intermediate layers may be provided. Furthermore, the intermediate layer is also called a hidden layer.

Figure 9:
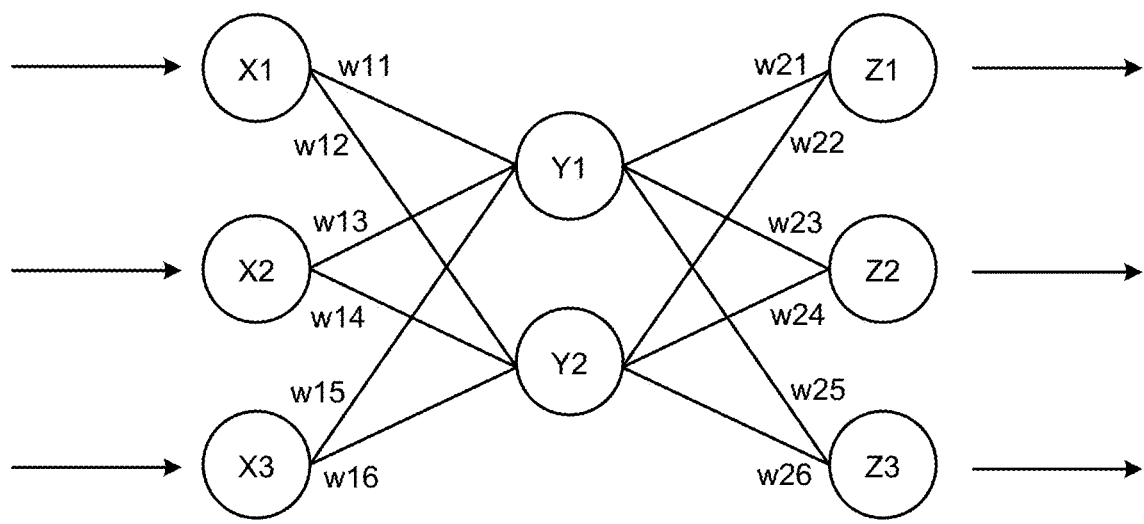
FIG. 9 is a diagram showing an example of a three-layer neural network according to the second embodiment.

FIG. 9 is a diagram showing an example of a three-layer neural network according to the second embodiment. In the case where the learning unit 65 uses the three-layer neural network illustrated in FIG. 9, when a plurality of inputs is provided to a plurality of input layers X1, X2, and X3, input values are multiplied by weights W1 and input to intermediate layers Y1 and Y2. Moreover, the values input to the intermediate layers Y1 and Y2 are further multiplied by weights W2 and output from output layers Z1, Z2, and Z3. The output results vary depending on the values of the weights W1 and W2.

The weights W1 include weights w11 to w16, and the weights W2 include weights w21 to w26. Values input to the input layer X1 is multiplied by the weight w11 and input to the intermediate layer Y1. Values input to the input layer X1 is multiplied by the weight w12 and input to the intermediate layer Y2. Values input to the input layer X2 is multiplied by the weight w13 and input to the intermediate layer Y1. Values input to the input layer X2 is multiplied by the weight w14 and input to the intermediate layer Y2. Values input to the input layer X3 is multiplied by the weight w15 and input to the intermediate layer Y1. Values input to the input layer X3 is multiplied by the weight w16 and input to the intermediate layer Y2. Values input to the intermediate layer Y1 is multiplied by the weight w21 and input to the output layer Z1. Values input to the intermediate layer Y1 is multiplied by the weight w23 and input to the output layer Z2. Values input to the intermediate layer Y1 is multiplied by the weight w25 and input to the output layer Z3. Values input to the intermediate layer Y2 is multiplied by the weight w22 and input to the output layer Z1. Values input to the intermediate layer Y2 is multiplied by the weight w24 and input to the output layer Z2. Values input to the intermediate layer Y2 is multiplied by the weight w26 and input to the output layer Z3.

The neural network to be used in the calculation model M learns a frequency detection method based on so-called supervised learning according to the data set including the combinations of the current sign signals $I_{sig1}$ and the current frequencies ω. That is, the neural network to be used in the calculation model M performs learning processing to create the calculation model M by adjusting the weights W1 and W2 such that a result output from the output layer in response to the current sign signal $I_{sig1}$ input to the input layer becomes closer to the current frequency ω obtained from a measured value.

Furthermore, the learning unit 65 can also create the calculation model M based on so-called unsupervised learning. Unsupervised learning refers to a method of creating a calculation model based on machine learning such that compression, classification, shaping, and the like can be performed on input data in the calculation model even when teacher data corresponding to the input data are not provided, by providing only input data in large quantity to a machine learning apparatus so as to cause the machine learning apparatus to learn how the input data are distributed. In unsupervised learning, it is possible to, for example, cluster data having similar features in the data set. Then, in unsupervised learning, it is possible to estimate an output by setting some criteria and using the result of clustering to assign outputs in such a way as to optimize the criteria. Furthermore, there is also a method called semi-supervised learning known as a problem setting which is intermediate between unsupervised learning and supervised learning. In semi-supervised learning, pairs of input and output data are used for only a part of a learning process, and only input data are used for the rest of the learning process.

Furthermore, deep learning, in which extraction of feature amounts themselves are learned, can be used as a learning algorithm to be used in the calculation model M, instead of the neural network. Alternatively, machine learning may be performed according to another known method such as genetic programming, function logic programming, or a support vector machine.

Returning to FIG. 8, description of the current frequency calculation unit 42A will be continued. The learning unit 65 sets the created calculation model M in the frequency calculation unit 66. The frequency calculation unit 66 inputs the current sign signal $I_{sig1}$ to the calculation model M, so that the frequency calculation unit 66 causes the calculation model M to calculate the current frequency $ω_{c1}$.

The hardware configuration of the current frequency calculation unit 42A is the same as the hardware configuration illustrated in FIG. 6. Each of the first acquisition unit 63, the second acquisition unit 64, and the frequency calculation unit 66 is partially implemented by the interface circuit 103. The functions of the first acquisition unit 63, the second acquisition unit 64, the learning unit 65, and the frequency calculation unit 66 are executed by the processor 101 reading and executing programs stored in the memory 102. Note that each of the first acquisition unit 63, the second acquisition unit 64, the learning unit 65, and the frequency calculation unit 66 may be partially or wholly formed with hardware such as an ASIC or FPGA.

Figure 10:
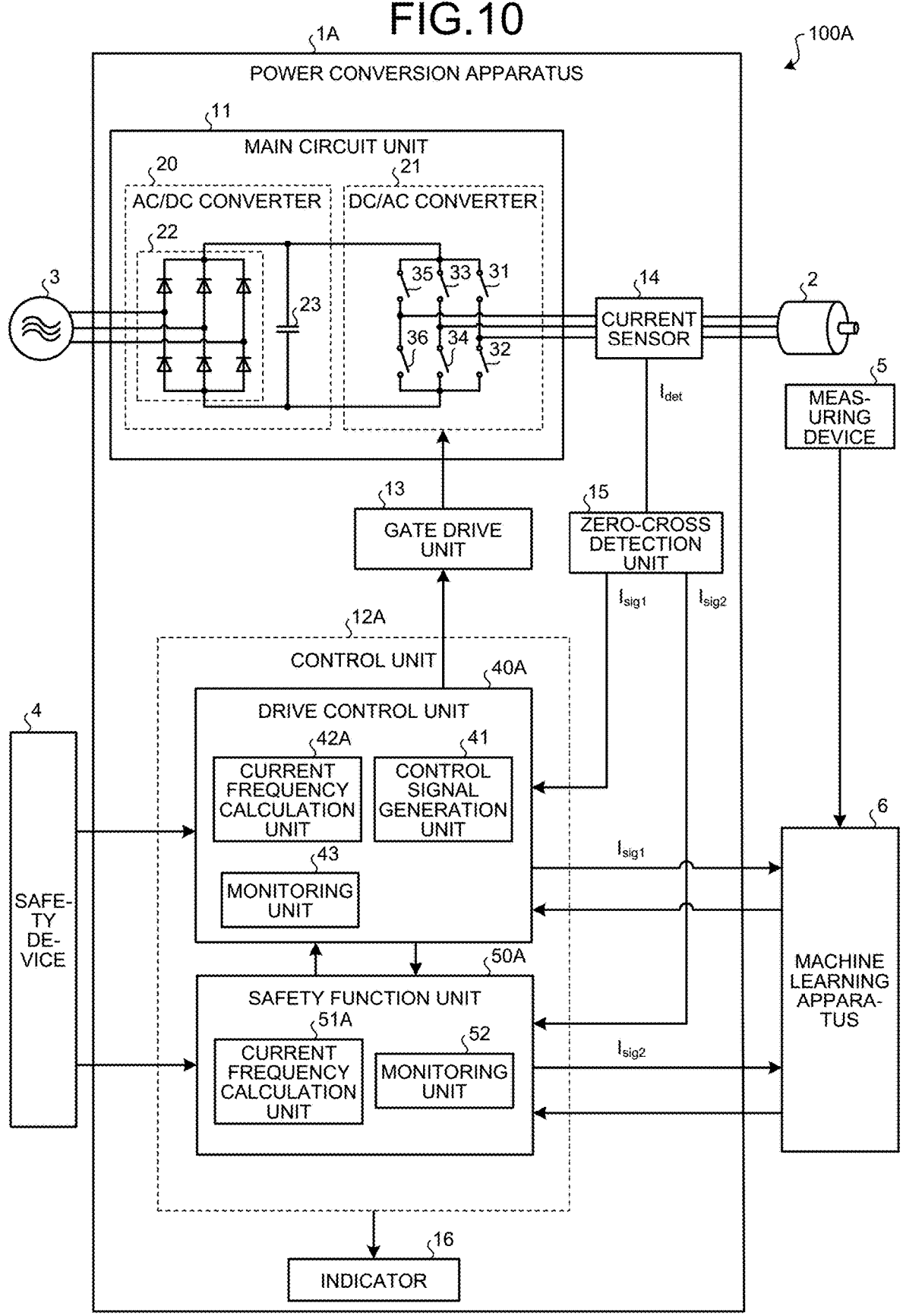
FIG. 10 is a diagram showing another example of the configuration of the drive control system including the power conversion apparatus according to the second embodiment.

In the above example, the calculation model is calculated inside the power conversion apparatus 1A. However, the calculation model M may be created by a machine learning apparatus different from the power conversion apparatus 1A. FIG. 10 is a diagram showing another example of the configuration of the drive control system including the power conversion apparatus according to the second embodiment. In the example shown in FIG. 10, the drive control system 100A according to the second embodiment includes the power conversion apparatus 1A, the motor 2, the AC power source 3, the safety device 4, the measuring device 5, and a machine learning apparatus 6.

The current frequency calculation unit 42A of the power conversion apparatus 1A illustrated in FIG. 10 includes none of the first acquisition unit 63, the second acquisition unit 64, and the learning unit 65 illustrated in FIG. 8. The current frequency calculation unit 42A illustrated in FIG. 10 is different from the current frequency calculation unit 42A illustrated in FIG. 7 in this respect. The current frequency calculation unit 51A illustrated in FIG. 10 has the same configuration as the current frequency calculation unit 42A illustrated in FIG. 10.

Figure 11:
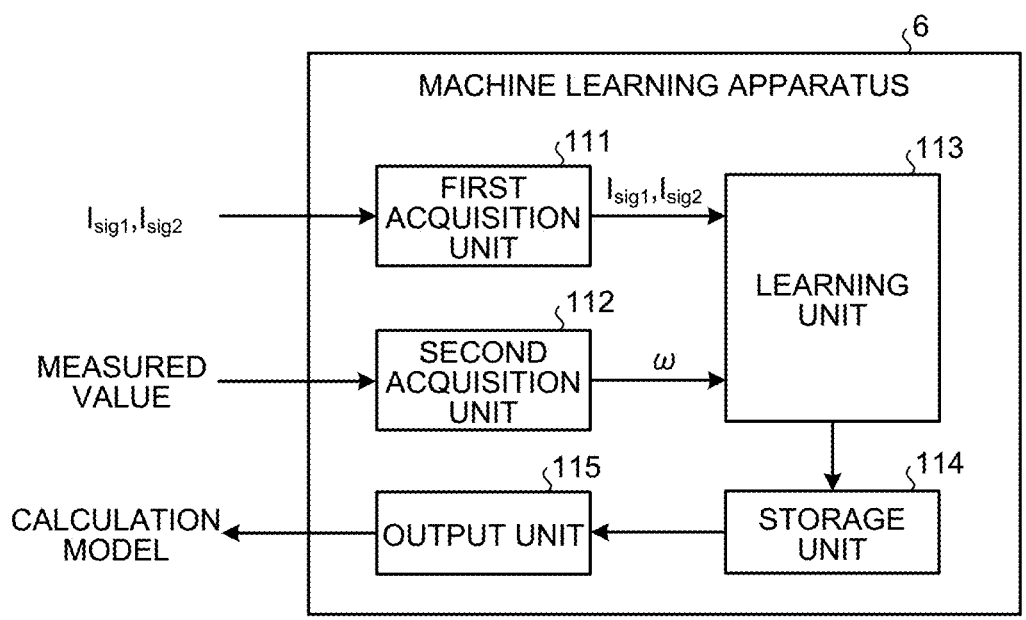
FIG. 11 is a diagram showing a configuration example of a machine learning apparatus according to the second embodiment.

FIG. 11 is a diagram showing a configuration example of the machine learning apparatus according to the second embodiment. As illustrated in FIG. 11, the machine learning apparatus 6 includes a first acquisition unit 111, a second acquisition unit 112, a learning unit 113, a storage unit 114, and an output unit 115. The machine learning apparatus 6 is, for example, communicably connected to the power conversion apparatus 1A via a network (not illustrated). Note that the machine learning apparatus 6 may be located on a cloud server.

The first acquisition unit 111 acquires, from the power conversion apparatus 1A, the current sign signals $I_{sig1}$ and $I_{sig2}$ as state variables at preset intervals via the network by wire communication or wireless communication. The second acquisition unit 112 acquires measured values from the measuring device 5 at preset intervals by wire communication or wireless communication via the network. For example, the measured values to be acquired by the second acquisition unit 112 are the same as the measured values to be acquired by the second acquisition unit 64. As with the second acquisition unit 64, the second acquisition unit 112 calculates the current frequency ω based on the acquired measured values.

The learning unit 113 creates the calculation model M by performing the same learning processing as the learning unit 65 according to a data set created based on combinations of the current sign signals $I_{sig1}$ acquired by the first acquisition unit 111 and the current frequencies ω calculated by the second acquisition unit 112. Furthermore, the learning unit 113 creates the calculation model M by performing the same learning processing as the learning unit 65 according to a data set created based on combinations of the current sign signals $I_{sig2}$ acquired by the first acquisition unit 111 and the current frequencies ω calculated by the second acquisition unit 112.

The learning unit 113 stores the created calculation model M in the storage unit 114. The output unit 115 transmits information on the calculation model M stored in the storage unit 114 to the power conversion apparatus 1A via the network by wire communication or wireless communication. The control unit 12A of the power conversion apparatus 1A sets the information on the calculation model M transmitted from the machine learning apparatus 6, in the current frequency calculation unit 42A and the current frequency calculation unit 51A. For example, the control unit 12A sets the calculation model M created by use of the current sign signal $I_{sig1}$ in the current frequency calculation unit 42A, and sets the calculation model M created by use of the current sign signal $I_{sig2}$ in the current frequency calculation unit 51A.

The hardware configuration of the machine learning apparatus 6 is the same as the hardware configuration illustrated in FIG. 6. Each of the first acquisition unit 111, the second acquisition unit 112, and the output unit 115 is partially implemented by the interface circuit 103. The storage unit 114 is implemented by the memory 102. The functions of the first acquisition unit 111, the second acquisition unit 112, the learning unit 113, and the output unit 115 are executed by the processor 101 reading and executing programs stored in the memory 102. Note that each of the first acquisition unit 111, the second acquisition unit 112, the learning unit 113, and the output unit 115 may be partially or wholly formed with hardware such as an ASIC or FPGA.

Note that the learning unit 113 can also create the calculation model M according to data sets created for a plurality of the power conversion apparatuses 1A. Furthermore, the machine learning apparatus 6 can also acquire the current sign signals $I_{sig1}$ and $I_{sig2}$ from a plurality of the power conversion apparatuses 1A used on the same site, or can also acquire the current sign signals $I_{sig1}$ and $I_{sig2}$ from a plurality of the power conversion apparatuses 1A independently operating on different sites. Moreover, the machine learning apparatus 6 can also add, during a process, the power conversion apparatus 1A from which the current sign signals $I_{sig1}$ and $I_{sig2}$ are to be acquired, or remove any of the power conversion apparatuses 1A from which the current sign signals $I_{sig1}$ and $I_{sig2}$ have been acquired. In addition, it is also possible to adopt a configuration in which the machine learning apparatus 6 that has created the calculation model M based on machine learning for a power conversion apparatus 1A can be installed in another power conversion apparatus 1A, so that the calculation model M can be updated by relearning for the another power conversion apparatus 1A.

The hardware configurations of the drive control unit 40A and the safety function unit 50A are the same as the hardware configurations of the drive control unit 40 and the safety function unit 50, respectively. The functions of the drive control unit 40A and the safety function unit 50A are executed by the respective processors 101 reading and executing programs stored in the respective memories 102. Note that each of the drive control unit 40A and the safety function unit 50A may be partially or wholly formed with hardware such as an ASIC or FPGA.

As described above, the current frequency calculation units 42A and 51A of the power conversion apparatus 1A according to the second embodiment calculate the current frequencies $\omega_{c1}$ and $\omega_{c2}$, respectively, by using the calculation model created by machine learning. As a result, the current frequencies $\omega_{c1}$ and $\omega_{c2}$ can be calculated accurately.

Furthermore, the current frequency calculation units 42A and 51A have the calculation model M created by machine learning based on the current sign signals $I_{sig1}$ and $I_{sig2}$ and the current frequency $\omega$ obtained from a measured value indicating the waveform of current or the speed of the motor 2 measured by the measuring device 5. Each of the current sign signals $I_{sig1}$ and $I_{sig2}$ is an example of a signal indicating at least either a rising timing or a falling timing. The current frequency calculation units 42A and 51A input the current sign signals $I_{sig1}$ and $I_{sig2}$ into the calculation model M to cause the calculation model M to calculate the current frequencies $\omega_{c1}$ and $\omega_{c2}$, respectively. The current sensor 14 is likely to be affected by noise when, for example, the motor 2 operates at a low speed or current supplied to the motor 2 is low. Even when the current sensor 14 is affected by noise, the current frequency calculation units 42A and 51A can accurately calculate the current frequencies $\omega_{c1}$ and $\omega_{c2}$, respectively, by causing the calculation model M to calculate the current frequencies $\omega_{c1}$ and $\omega_{c2}$.

Furthermore, the current frequency calculation units 42A and 51A each include the first acquisition unit 63, the second acquisition unit 64, and the learning unit 65. The first acquisition unit 63 acquires the current sign signals $I_{sig1}$ and $I_{sig2}$ as state variables. The second acquisition unit 64 acquires a measured value from the measuring device 5, and calculates the current frequency $\omega$ based on the acquired measured value. The learning unit 65 creates the calculation model M by using machine learning based on a data set created by combinations of the state variables acquired by the first acquisition unit 63 and the current frequencies $\omega$ calculated by the second acquisition unit 64. As a result, the power conversion apparatus 1A can create the calculation model M, so that the current frequencies $\omega_{c1}$ and $\omega_{c2}$ can be calculated accurately even when the power conversion apparatuses 1A have individual differences.

Furthermore, the drive control system 100A according to the second embodiment includes the machine learning apparatus 6 that creates the calculation model M. The machine learning apparatus 6 includes the first acquisition unit 111, the second acquisition unit 112, and the learning unit 113. The first acquisition unit 111 acquires the current sign signals $I_{sig1}$ and $I_{sig2}$ as state variables. The second acquisition unit 112 acquires a measured value from the measuring device 5, and calculates the current frequency $\omega$ based on the acquired measured value. The learning unit 113 creates the calculation model M by using machine learning based on a data set created by combinations of the state variables acquired by the first acquisition unit 111 and the current frequencies $\omega$ calculated by the second acquisition unit 112. As a result, the machine learning apparatus 6 can create, for example, the calculation model M common to a plurality of the power conversion apparatuses 1A, so that the calculation model M can be created more easily than in the case of creating the calculation model M separately for each power conversion apparatus 1A.

The configurations set forth in the above embodiments show examples of the subject matter of the present invention, and it is possible to combine the configurations with another technique that is publicly known, and is also possible to make omissions and changes to part of the configurations without departing from the gist of the present invention.

REFERENCE SIGNS LIST 1, 1A power conversion apparatus; 2 motor; 3 AC power source; 4 safety device; 5 measuring device; 6 machine learning apparatus; 11 main circuit unit; 12, 12A control unit; 13 gate drive unit; 14 current sensor; 15 zero-cross detection unit; 16 indicator; 20 AC/DC converter; 21 DC/AC converter; 22 three-phase diode bridge; 23 smoothing capacitor; 31, 32, 33, 34, 35, 36 switching element; 40, 40A drive control unit; 41 control signal generation unit; 42, 42A, 51, 51A current frequency calculation unit; 43, 52 monitoring unit; 44, 53 current frequency self-diagnosis unit; 45, 54 current frequency mutual diagnosis unit; 46, 55 output frequency self-diagnosis unit; 50, 50A safety function unit; 61, 62 current sign signal generation unit; 63, 111 first acquisition unit; 64, 112 second acquisition unit; 65, 113 learning unit; 66 frequency calculation unit; 71 PWM signal generation unit; 72 output frequency calculation unit; 80 half-wave rectifier unit; 81 operational amplifier; 82 filter; 83 hysteresis comparator; 91 comparator; 92, 93, 94, 95, 96 resistor; 100, 100A drive control system; 114 storage unit; 115 output unit; $I_{det}$, $I_{detr}$ current detection signal; $I_{sig1}$, $I_{sig2}$ current sign signal; $R_{th1}$, $R_{th2}$ specified range; Th1, Th2 sign inversion threshold value; $\omega_{c1}$, $\omega_{c2}$ current frequency; $\omega_{out}$ output frequency; $\omega_{th}$ specified speed limit value.

The invention claimed is:

1. A power conversion apparatus comprising:
   a main circuit to convert DC power into AC power, and supply the converted AC power to a motor;
   a controller to control the main circuit;
   a current sensor to detect a current supplied from the main circuit to the motor; and
   a zero-cross detection unit including a half-wave rectifier to half-wave rectify a current detection signal output from the current sensor, wherein
   the controller includes:
   a first processing circuit
   to calculate a current frequency based on at least either a rising timing or a falling timing of the current detection signal half-wave rectified by the half-wave rectifier, the current frequency being a frequency of the current; and
   to monitor a speed of the motor based on the current frequency calculated.

2. The power conversion apparatus according to claim 1, further comprising:
   a hysteresis comparator to compare, with different threshold values, the rising timing and the falling timing of the current detection signal half-wave rectified by the half-wave rectifier, wherein
   the first processing circuit calculates the current frequency based on the rising timing and the falling timing obtained from results of the comparison performed by the hysteresis comparator.

3. The power conversion apparatus according to claim 1, wherein
   the first processing circuit stops power supply from the main circuit to the motor when the current frequency calculated or a value directly proportional to the current frequency exceeds a specified speed limit value.

4. The power conversion apparatus according to claim 3, further comprising:
   a plurality of the first processing circuits, wherein
   the first processing circuits stop the power supply from the main circuit to the motor when a difference between the current frequencies calculated by the plurality of first processing circuits is outside a preset range.

5. The power conversion apparatus according to claim 3, further comprising:
   a second processing circuit
   to generate PWM signals for performing PWM control of the main circuit; and
   to calculate an output frequency that is a frequency of an AC voltage output from the main circuit to the motor, wherein
   the first processing circuits stop the power supply from the main circuit to the motor when a difference between the current frequency calculated and the output frequency calculated by the second processing circuit is outside a preset range.

6. The power conversion apparatus according to claim 1, wherein
   the first processing circuit calculates the current frequency by using a calculation model created by machine learning.

7. The power conversion apparatus according to claim 6, wherein
   the calculation model is created by machine learning based on a signal and a frequency of the current, the signal indicating at least either the rising timing or the falling timing, the frequency of the current being obtained from a measured value, the measured value indicating a waveform of the current or a speed of the motor measured by an external measuring device, and
   the first processing circuit causes the calculation model to calculate the current frequency, by inputting the signal indicating at least either the rising timing or the falling timing to the calculation model.

8. The power conversion apparatus according to claim 7, wherein
   the first processing circuit
   acquires, as state variables, the signals each indicating at least either the rising timing or the falling timing;
   acquires the measured values from the external measuring device, and calculates frequencies of the current based on the measured values acquired; and
   creates the calculation model by using machine learning based on a data set created by combinations of the state variables acquired and the frequencies of the current calculated.

9. A drive control system comprising:
   the power conversion apparatus according to claim 7; and
   a machine learning apparatus to create the calculation model, wherein
   the machine learning apparatus includes:
   a second processing circuit
   to acquire, as state variables, the signals each indicating at least either the rising timing or the falling timing;
   to acquire the measured values from the external measuring device, and calculate frequencies of the current based on the measured values acquired; and
   to create the calculation model by machine learning based on a data set created by combinations of the state variables acquired and the frequencies of the current calculated.

10. A motor monitoring method comprising:
    converting DC power into AC power and detecting, with a current sensor, a current supplied from a main circuit to a motor, the main circuit supplying the converted AC power to the motor;
    detecting a current supplied from the main circuit to the motor and outputting a current detection signal;
    half-wave rectifying the current detection signal output from the detecting;
    calculating a current frequency based on at least either a rising timing or a falling timing of the current detection signal output from the detecting and half-wave rectified by the half-wave rectifying, the current frequency being a frequency of the current; and
    monitoring a speed of the motor based on the calculated current frequency.

* * * * *